United States Patent
Kim et al.

(10) Patent No.: US 8,265,210 B2
(45) Date of Patent: Sep. 11, 2012

(54) ITERATIVE RECEIVER AND METHOD FOR DETECTING TRANSMITTED SIGNAL THEREOF

(75) Inventors: Seong-Rag Kim, Daejeon (KR); Jun-Young Nam, Daejeon (KR); Hyun-Kyu Chung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 743 days.

(21) Appl. No.: 12/515,316

(22) PCT Filed: Nov. 13, 2007

(86) PCT No.: PCT/KR2007/005688
§ 371 (c)(1),
(2), (4) Date: May 18, 2009

(87) PCT Pub. No.: WO2008/065467
PCT Pub. Date: Jun. 12, 2008

(65) Prior Publication Data
US 2009/0304125 A1    Dec. 10, 2009

(30) Foreign Application Priority Data

Dec. 5, 2006  (KR) .................. 10-2006-0122075
May 30, 2007  (KR) .................. 10-2007-0052598

(51) Int. Cl.
*H04L 1/00* (2006.01)
(52) U.S. Cl. ........ 375/346; 375/144; 375/148; 455/501; 455/63.1; 455/296
(58) Field of Classification Search .................. 375/144, 375/148, 262, 265, 282, 340, 346, 348, 349; 455/501, 63.1, 67.11, 67.13, 296, 226.1, 455/226.2
See application file for complete search history.

(56) References Cited

U.S. PATENT DOCUMENTS

| | | | |
|---|---|---|---|
| 6,996,194 B2 * | 2/2006 | Pukkila et al. | 375/340 |
| 7,106,813 B1 | 9/2006 | Ling | |
| 7,319,726 B1 * | 1/2008 | Wu et al. | 375/342 |
| 2005/0232195 A1 | 10/2056 | Jones | |
| 2007/0286312 A1 * | 12/2007 | Kim | 375/340 |

FOREIGN PATENT DOCUMENTS

KR    10-2003-0010587 A    2/2003
(Continued)

OTHER PUBLICATIONS

Padam L. Kafle and Abu B. Sesay, Iterative Semi-Blind Multiuser Detection for Coded MC-CDMA Uplink Systems, IEEE Transactions on Communications, Jul. 2003, pp. 1034-1039, vol. 51, No. 7.

(Continued)

*Primary Examiner* — Dac Ha
(74) *Attorney, Agent, or Firm* — Kile Park Goekjian Reed & McManus PLLC

(57) ABSTRACT

In an iterative receiver, a signal detector estimates interference from an estimated transmitted signal, and cancels the estimated interference from a signal received through an antenna. A decoder performs channel decoding by using the interference cancelled received signal. A soft decision unit performs a soft decision process on the transmitted signal by using the channel decoded signal. A channel estimator estimates a channel by using the soft decision applied transmitted signal and the received signal. A covariance estimator estimates covariance on the sum signal of the interference and noise by using the soft decision applied transmitted signal, the received signal, and the estimated channel. A hard decision unit determines the transmitted signal by using the channel decoded signal after interference cancellation, channel decoding, estimated transmitted signal updating, channel estimation, and covariance estimation are iterated a number of times.

14 Claims, 5 Drawing Sheets

FOREIGN PATENT DOCUMENTS

| | | | |
|---|---|---|---|
| KR | 10-2005-0041348 A | 5/2005 |
| KR | 10-2006-0079662 A | 7/2006 |
| KR | 10-2007-0111079 A | 11/2007 |
| WO | 03/084092 A2 | 10/2003 |
| WO | 03/084094 A2 | 10/2003 |
| WO | 2006/062381 A2 | 6/2006 |

OTHER PUBLICATIONS

Christian Kuhn and Joachim Hagenauer, Single Antenna Interference Cancellation Using a List-Sequential (LISS) Algorithm, IEEE Globecom 2005, pp. 1604-1608.

Pekka A. Ranta, Ari Hottinen and Zhi-Chun Honkasalo, Co-channel interference cancelling receiver for TDMA mobile systems, Proc IEEE ICC'95, 1995, pp. 17-21.

Dae-Ho Jeong and Hwan-Yong Kim, Simple Stopping Criterion Algorithm using Variance Values of Noise in Turbo Code, Journal of the Institute of Electronics Engineers of Korea(IEEK). TC(Telecommunication), Mar. 2006, pp. 103-110, vol. 43, Issue 3.

International Search Report of International Application No. PCT/KR2007/005688.

Written Opinion of International Application No. PCT/KR2007/005688.

* cited by examiner

[FIG. 1]
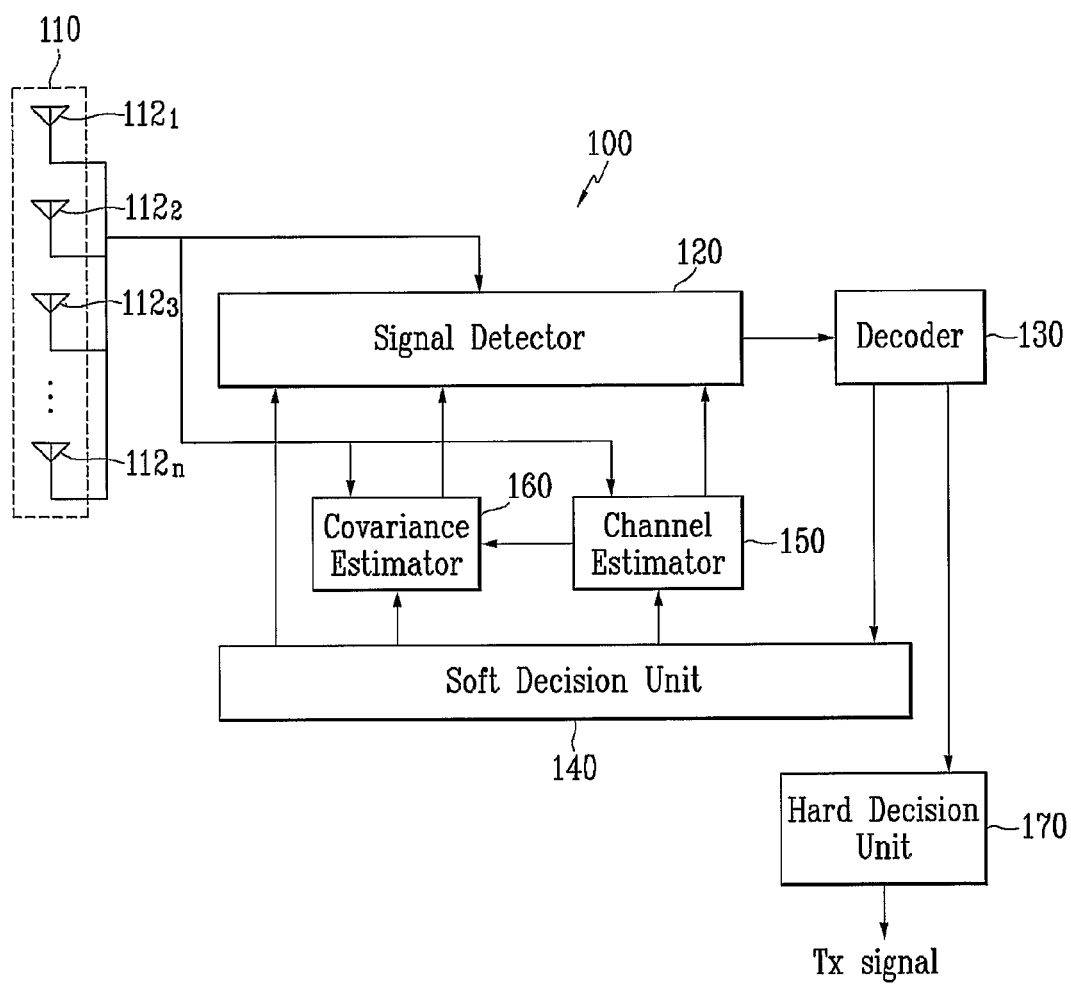

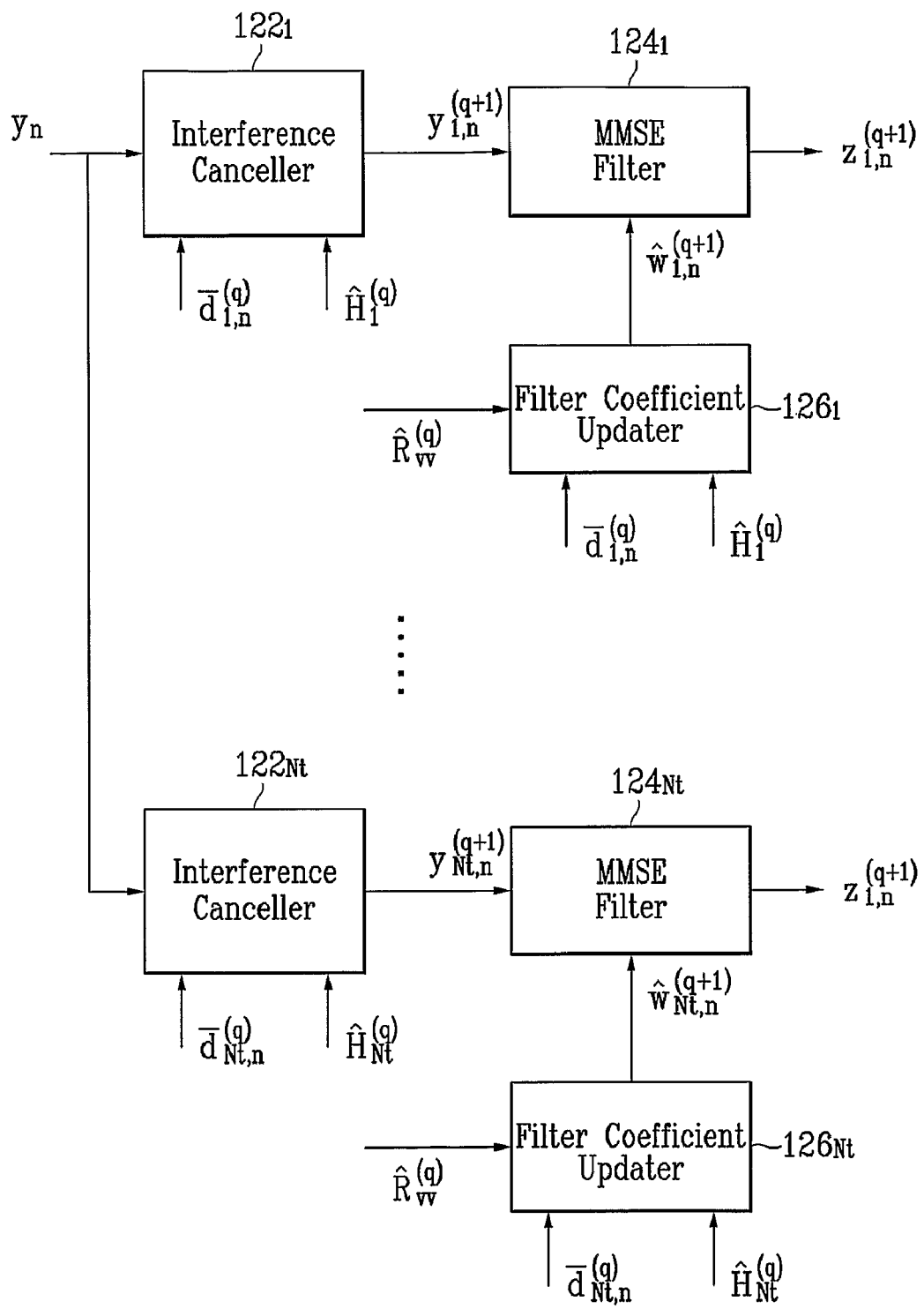
[FIG. 2]

[FIG. 3]
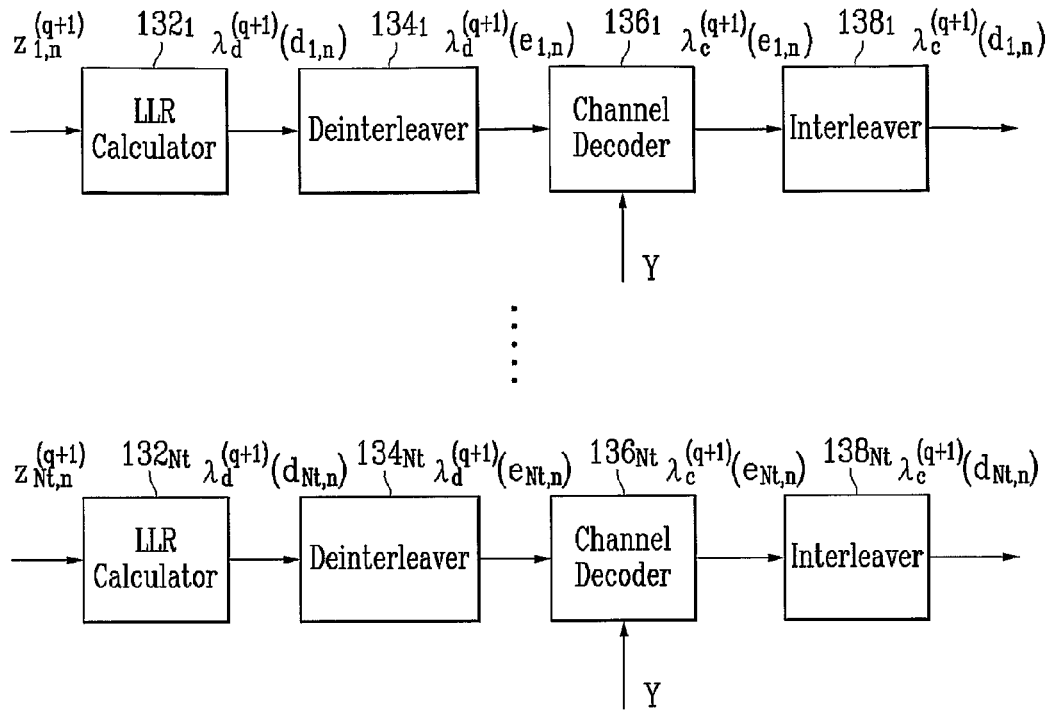
[FIG. 4]
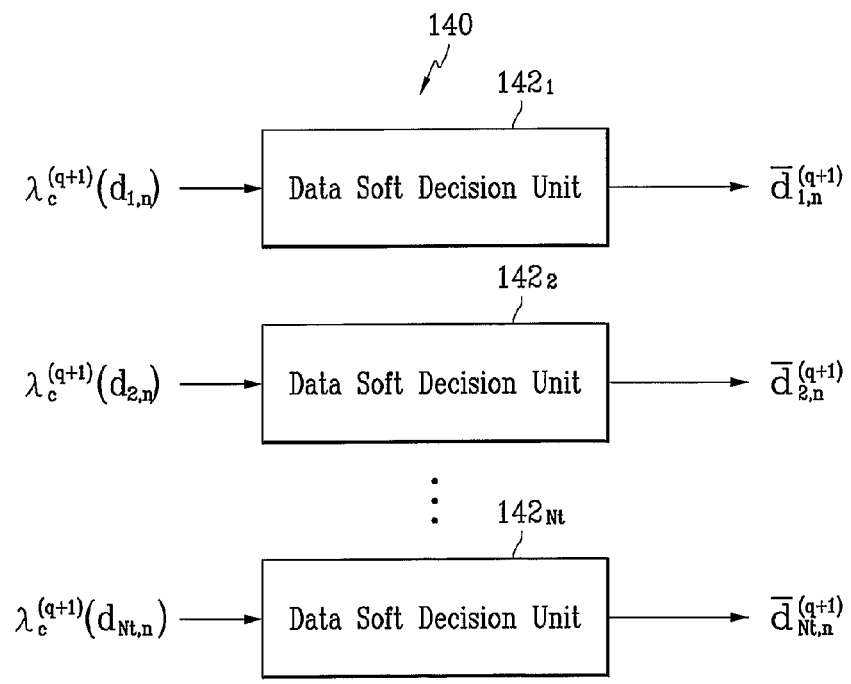

[FIG. 5]
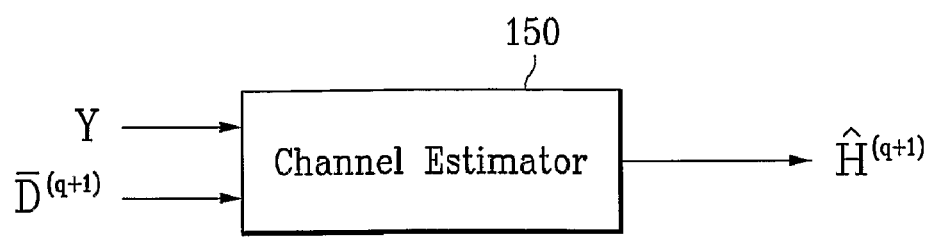
[FIG. 6]
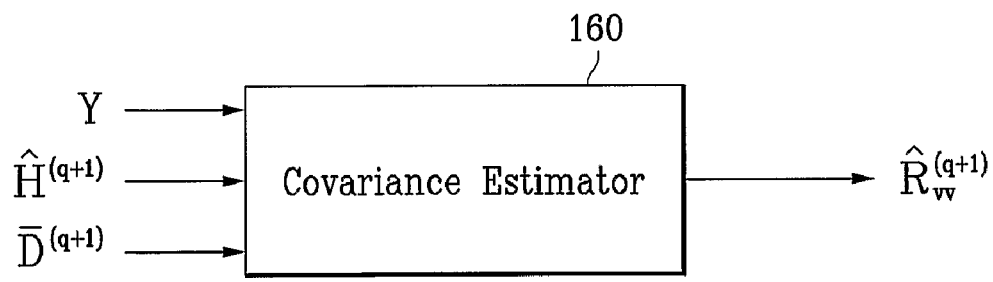

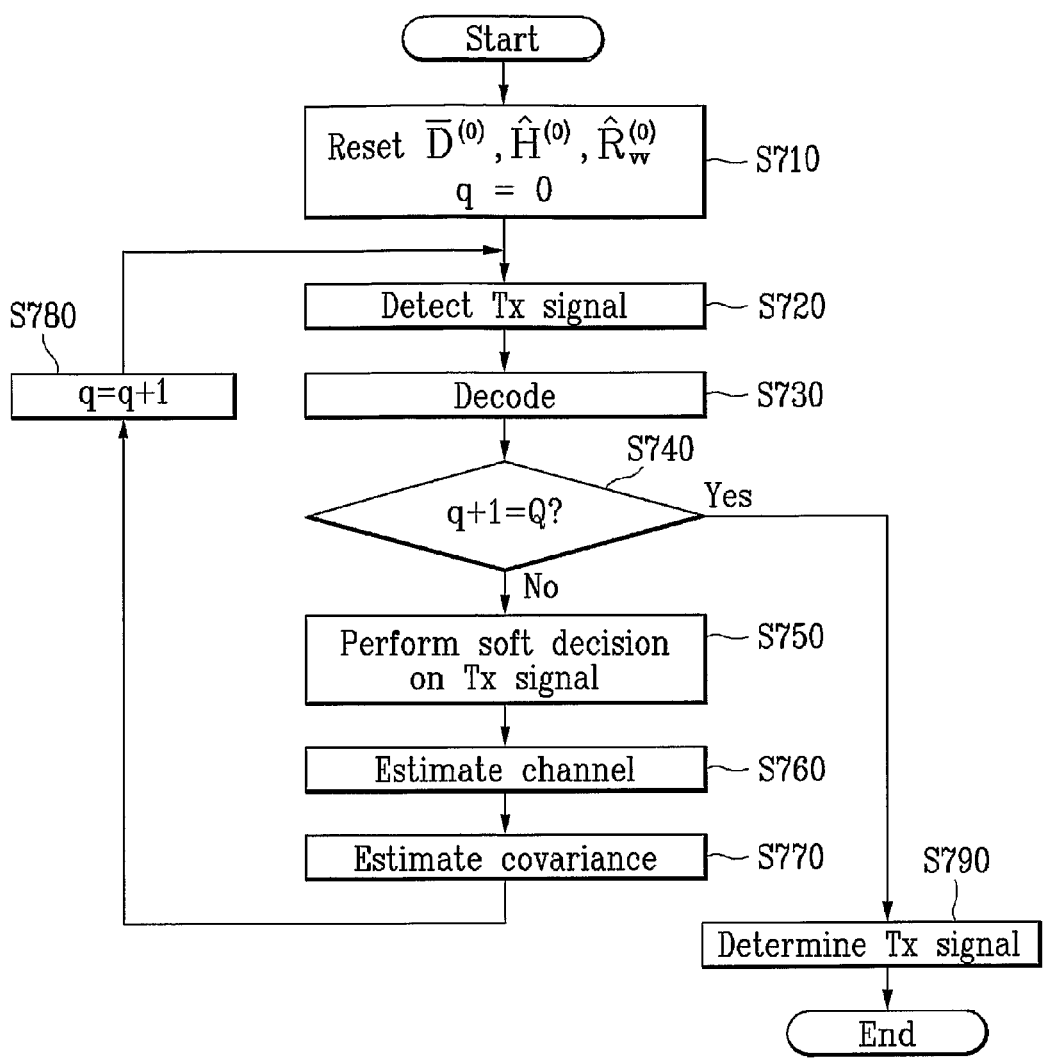
[FIG. 7]

ITERATIVE RECEIVER AND METHOD FOR DETECTING TRANSMITTED SIGNAL THEREOF

BACKGROUND OF THE INVENTION (a) Field of the Invention

The present invention relates to an iterative receiver and a method for detecting a transmitted signal thereof.

This work was supported by the IT R&D program of MIC/IITA [2006-S-001-01, Development of adaptive radio access and transmission technologies for 4th generation mobile communications].

(b) Description of the Related Art

In a cellular mobile communication system, in order to overcome a service area limit and a subscriber capacity limit, the service area is divided into a plurality of small regions, that is, cells, and the same frequency bandwidth is used by two cells that are separated from each other so that the frequency may be reused spatially. In this instance, intercell interference is generated when the cell size is reduced so as to increase the subscriber capacity. Therefore, the receiver can accurately detect the signal by eliminating interference from the received signal. However, signal detection performance is deteriorated since the receiver cannot accurately estimate the interference.

Regarding prior art, to reduce the intercell interference, the technique of combining and detecting cell signals of a plurality of cells on the cell boundary using a maximum likelihood sequence detection (MLSD) scheme has been proposed.

However, since the Viterbi algorithm is used for the combination and detection process, system complexity is exponentially increased in proportion to the entire number of users of the cells.

As another solution for the problem of calculation complexity, iterative receiver based on the turbo principle has been proposed. However, the proposal is not applicable when no channel information is given since the proposal assumes perfect channel estimation.

Further, to reduce the intercell interference, the technique of detecting linear multi-user has been proposed. However, it increases the complexity of operation since it calculates the number of multi-users or the inverse matrix having a dimension of a spread factor.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an iterative receiver for improving performance of receiving signals from a transmitter, and a method for detecting the transmitted signals thereof.

In one aspect of the present invention, an iterative receiver includes: a signal detector for canceling interference estimated from a transmitted signal to which a soft decision process is applied from a received signal; a decoder for performing a channel decoding process by using the interference cancelled received signal; a soft decision unit for performing a soft decision process on the transmitted signal by using the channel decoded signal, and transmitting a resultant signal to the signal detector; a channel estimator for estimating a channel through which the transmitted signal is passed by using the soft decision applied transmitted signal and the received signal; a covariance estimator for estimating covariance on the sum signal of the interference and noise by using the soft decision applied transmitted signal, the received signal, and the estimated channel; and a hard decision unit for determining the transmitted signal by using the signal output by the decoder.

In another aspect of the present invention, a method for an iterative receiver to detect a transmitted signal includes: canceling estimated interference from a received signal by using estimated channel information; channel decoding the transmitted signal by using the estimated interference cancelled received signal; performing a soft decision process on the transmitted signal by using the channel decoded signal; updating the estimated channel information by using the soft decision applied transmitted signal and the received signal; iterating the canceling, the channel decoding, the performing of the soft decision process, and the updating a predetermined number of times; and determining the transmitted signal from the channel decoded signal when the processes are iterated a predetermined number of times.

BRIEF DESCRIPTION OF THE DRAWINGS

FIG. 1 shows an iterative receiver according to an exemplary embodiment of the present invention.

FIG. 2 shows a block diagram of a signal detector shown in FIG. 1.

FIG. 3 shows a block diagram of a decoder shown in FIG. 1.

FIG. 4 shows a block diagram of a soft decision unit shown in FIG. 1.

FIG. 5 shows input and output signals of a channel estimator shown in FIG. 1.

FIG. 6 shows input and output signals of a covariance estimator shown in FIG. 1.

FIG. 7 shows an operational flowchart of a receiver according to an exemplary embodiment of the present invention.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising", and variations such as "comprises", will be understood to imply the inclusion of stated elements but not the exclusion of any other elements. Also, the terms of a unit, a device, and a module in the present specification represent a unit for processing a predetermined function or operation, which can be realized by hardware, software, or combination of hardware and software.

An iterative receiver and a method for detecting a transmitted signal thereof according to an exemplary embodiment of the present invention will now be described with reference to the accompanying drawings. The exemplary embodiment of the present invention is applicable to the multi input multi output (MIMO) communication system requiring canceling of inter-antenna interference, the inter-cell interference canceling system, and other systems for canceling interference.

FIG. 1 shows an iterative receiver according to an exemplary embodiment of the present invention.

As shown in FIG. 1, the iterative receiver 100 includes an antenna array 110, a signal detector 120, a decoder 130, a soft decision unit 140, a channel estimator 150, a covariance estimator 160, and a hard decision unit 170.

The antenna array 110 includes a plurality of receive antennas ($112_1$-$112_m$), and receives a signal from a transmitter (not shown) and transmits the signal to the signal detector 120. The signal transmitted from a plurality of transmit antennas will be referred to as a transmitted signal, and the signal received through a plurality of receive antennas will be called a received signal.

The signal detector 120 cancels an interference signal from the received signal and suppresses the residual interference signal through a minimum mean squared error (MMSE) filter to detect and output a signal corresponding to a plurality of transmitted signals.

The decoder 130 calculates a log-likelihood ratio (LLR) by using the output signal of the signal detector 120, performs a channel decoding process by using the calculated LLR, and outputs a resultant signal.

The soft decision unit 140 performs a soft decision process on a plurality of transmitted signals by using the channel decoded signal output by the decoder 130.

The channel estimator 150 estimates the channel through which the transmitted signals are passed by using the transmitted signals to which the soft decision process is applied by the soft decision unit 140 and a received signal.

The covariance estimator 160 estimates the covariance on the summed signal of interference and noise by using the transmitted signals output by the soft decision unit 140, channel information estimated by the channel estimator 150, and the received signal.

The hard decision unit 170 determines a plurality of transmitted signals by using the signal output by the decoder 130 when the signal detector 120, the decoder 130, the soft decision unit 140, the channel estimator 150, and the covariance estimator 160 are iterated for a predetermined number of times.

FIG. 2 shows a block diagram of a signal detector shown in FIG. 1, and FIG. 3 shows a block diagram of a decoder shown in FIG. 1. FIG. 4 shows a block diagram of a soft decision unit shown in FIG. 1. FIG. 5 shows input and output signals of a channel estimator shown in FIG. 1, and FIG. 6 shows input and output signals of a covariance estimator shown in FIG. 1. The antenna array 110 is illustrated to include $N_r$ receive antennas. The transmitted signal is transmitted from one or more transmitters, and in this instance, it is assumed that the sum of the transmit antennas is $N_s$ and the number of transmitted signals to be divided by the receiver 100 is $N_t$. Also, the transmit antenna is assumed to transmit $N_p$ pilots from among N symbols of one block.

The signal received at the j-th receive antenna from the n-th symbol interval is defined to be $y_{j,n}$, and the received signal vector $y_n$ in the n-th symbol interval is defined to be $[y_{1,n}\ y_{2,n}\ \ldots\ y_{N_r,n}]^T$. The signal transmitted from the i-th transmit antenna in the n-th symbol interval is defined to be $d_{i,n}$, and the transmitted signal vector $d_n$ is defined to be $[d_{1,n}\ d_{2,n}\ \ldots\ d_{N_t,n}]^T$. The channel coefficient vector $h_i$ between the i-th transmit antenna and the receive antenna is defined to be $[h_{1,i}\ h_{2,i}\ \ldots\ h_{N_r,i}]^T$, and the entire channel matrix H is defined to be $[h_1\ h_2\ \ldots\ h_{N_t}]$. A quasi-static channel in which a channel is not varied during one block of N symbols is assumed. Here, T is a transpose vector. From the assumptions, the received signal vector $y_n$ in the n-th symbol can be expressed by Equation 1.

$$y_n = Hd_n + v_n \quad \text{(Equation 1)}$$

Here, $v_n$ is a signal including the transmitted signal that cannot be divided and detected as ($N_s$-$N_t$) signals from among the transmitted signals and white noise, and $v_n$ is defined to be $[v_{1,n}\ v_{2,n}\ \ldots\ v_{N_r,n}]^T$ and is called an undetected interference vector. $v_n$ is assumed to have the Gaussian distribution of CN(0, $R_{vv}$), and the covariance $R_{vv}$ is given as $E(v_n^H v_n)$.

The iterative receiver 100 is operable by blocks, each of which has N symbols, and the received signal Y of one block is expressed in vector matrix format as expressed by Equation 2.

$$Y = HD + V \quad \text{(Equation 2)}$$

Here, $Y = [y_1^T\ y_2^T\ \ldots\ y_N^T]^T$, $D = [d_1^T\ d_2^T\ \ldots\ d_N^T]^T$, and $V = [v_1^T\ v_2^T\ \ldots\ v_N^T]^T$. Therefore, the desired transmitted signal $d_{k,n}$ is expressed by Equation 3.

$$y_n = h_k d_{k,n} + H_k d_{k,n} + v_n \quad \text{(Equation 3)}$$

Here, $H_k$ is a channel matrix of H without $h_k$, and $d_{k,n}$ is a transmitted data vector of $d_n$ without the k-th column.

Referring to FIG. 2, the signal detector 120 includes a plurality of interference cancellers ($122_1$-$122_{Nt}$), a plurality of MMSE filters ($124_1$-$124_{Nt}$), and a plurality of filter coefficient updaters ($126_1$-$126_{Nt}$). In this instance, the respective number of interference cancellers ($122_1$-$122_{Nt}$), MMSE filters ($124_1$-$124_{Nt}$) and filter coefficient updates ($126_1$-$126_{Nt}$) corresponds to the number of the transmitted signals to be divided and to the plurality of transmitted signals to be divided.

The respective interference cancellers ($122_1$-$122_{Nt}$) generate interference estimates, cancel the interference estimate from the received signal as shown in Equation 4 based on the generated interference estimate, and output a resultant signal.

$$y_{k,n}^{(q+1)} = y_n - \hat{H}_k^{(q)} \bar{d}_{k,n}^{(q)} \quad \text{(Equation 4)}$$

Here, $\hat{H}_k^{(q)}$ is a channel matrix estimated by the channel estimator 150 according to the q-th iteration result, and $\bar{d}_{k,n}^{(q)}$ is the transmitted signal value to which soft decision is performed by the soft decision unit 140 according to the q-th iteration result. It is given that $\bar{d}_{k,n}^{(0)} = 0$ at the first stage (q=0 or (q+1)=1), and $\hat{H}_k^{(0)}$ is the initial value of $H_k$ acquired by using a pilot symbol.

The respective MMSE filters ($124_1$-$124_{Nt}$) filter the output signals of the corresponding interference cancellers ($122_1$-$122_{Nt}$) and output filtered results. That is, the output signals of the corresponding interference cancellers ($122_1$-$122_{Nt}$) include uncancelled interference and undetected interference. Therefore, the MMSE filters ($124_1$-$124_{Nt}$) suppress the interference. In detail, the MMSE filters ($124_1$-$124_{Nt}$) multiply the output signals of the corresponding interference cancellers ($122_1$-$122_{Nt}$) by a weight vector to suppress residual interference, and then output resultant signals. In this instance, the output signals of the MMSE filters ($124_1$-$124_{Nt}$) are given by Equation 5.

$$z_{k,n}^{(q+1)} = (w_{k,n}^{(q+1)})^H y_{k,n}^{(q+1)} \quad \text{(Equation 5)}$$

Here, $w_k^{(q+1)}$ is weight coefficient vectors of a plurality of MMSE filters 124, and $w_k^{(q+1)}$ is expressed by Equation 6.

$$w_{k,n}^{(q+1)} = (\hat{h}_k^{(q)} (\hat{h}_k^{(q)})^H + \hat{H}_k^{(q)} Q_{k,n}^{(q)} \hat{H}_k^{(q)} + \hat{R}_{vv}^{(q)})^{-1} \hat{h}_k^{(q)} \quad \text{(Equation 6)}$$

Here, the initial value $\hat{R}_{vv}^{(0)}$ is acquired by using $\hat{H}_k^{(0)}$ and the pilot symbol. $Q_{k,n}^{(q)}$ is acquired as expressed by Equation 7.

$$Q_{k,n}^{(q)} = \text{Diag}(1 - (\bar{d}_{1,n}^{(q)})^2, \ldots, 1 - (\bar{d}_{k-1,n}^{(q)})^2, 1 - (\bar{d}_{k+1,n}^{(q)})^2, \ldots, 1 - (\bar{d}_{N_t,n}^{(q)})^2) \quad \text{(Equation 7)}$$

The respective filter coefficient updaters ($126_1$-$126_{Nt}$) output weight coefficients $w_k$ to the corresponding MMSE filters ($124_1$-$124_{Nt}$).

Referring to FIG. 3, the decoder 130 includes a plurality of LLR calculators ($132_1$-$132_{Nt}$), a plurality of deinterleavers ($134_1$-$134_{Nt}$), a plurality of channel decoders ($136_1$-$136_{Nt}$), and a plurality of interleavers ($138_1$-$138_{Nt}$), and channel-decodes the signals output by the MMSE filters 124. In this instance, the respective number of LLR calculators ($132_1$-$132_{Nt}$), deinterleavers ($134_1$-$134_{Nt}$), channel decoders ($136_1$-$136_{Nt}$), and interleavers ($138_1$-$138_{Nt}$) corresponds to the number of transmitted signals to be divided and to the transmitted signals to be divided.

The respective LLR calculators ($132_1$-$132_{Nt}$) calculate the LLR's by using the output signals of the corresponding MMSE filters ($124_1$-$124_N$) as expressed by Equation 8.

$$\lambda_d^{(q+1)}(d_{k,n}) = \frac{4\mathrm{Re}(z_{k,n}^{(q+1)})}{1 - (w_{k,n}^{(q+1)})^H \hat{h}_{k,n}^{(q)}} \quad \text{(Equation 8)}$$

The deinterleavers ($134_1$-$134_{Nt}$) deinterleave an output signal $\{d_k\}$ sequence of the corresponding LLR calculators ($132_1$-$132_{Nt}$) to generate a sequence $\{e_k\}$, and output a corresponding LLR $\lambda_d^{(q+1)}(e_k)$.

The respective channel decoders ($136_1$-$136_{Nt}$) perform a channel decoding process by using the output signals $\lambda_d^{(q+1)}(e_k)$ of the corresponding deinterleavers ($134_1$-$134_{Nt}$), and output a log-ratio of a posterior probability (LAPP) $\lambda_c^{(q+1)}(e_k)$ for the coded bit ($e_k$) and the LAPP for the decoded bit.

The respective interleavers ($138_1$-$138_{Nt}$) interleave the output signals $\lambda_c^{(q+1)}(e_k)$ of the corresponding channel decoders ($136_1$-$136_{Nt}$) and output the interleaved signals $\{\lambda_c^{(q+1)}(d_k)\}$.

Referring to FIG. 4, the soft decision unit 140 includes a plurality of data soft decision units ($142_1$-$142_{Nt}$). The number of data soft decision units ($142_1$-$142_{Nt}$) corresponds to the number of transmitted signals to be divided, and corresponds to a plurality of transmitted signals.

The respective data soft decision units ($142_1$-$142_{Nt}$) perform a soft decision process on the transmitted signal by using the output signal $\{\lambda_c^{(q+1)}(d_k)\}$ of the corresponding interleavers ($138_1$-$138_{Nt}$). The transmitted signal $\bar{d}$ to which the soft decision is applied can be expressed by Equation 9.

$$\bar{d}_{k,n}^{(q+1)} = \tanh\left(\frac{\lambda_c^{(q+1)}(d_{k,n})}{2}\right) \quad \text{(Equation 9)}$$

Here, since the interleaver 138 generates no output in the case of q=0 or (q+1)=1, it is given that $\lambda_c^{(0)}(d_{k,n})=0$ and it is also given that $\bar{d}_{k,n}^{(0)}=0$ according to Equation 4.

Referring to FIG. 5, the channel estimator 150 estimates the channel H through which the transmitted signal is passed by using the received signal Y and the output signals of the data soft decision units ($142_1$-$142_{Nt}$). The estimated channel $\hat{H}$ is expressed by Equation 10.

$$\hat{H}^{(q+1)} = \left(\sum_{n=1}^{N} (y_n(\bar{d}_n^{(q+1)})^H)\right)\left(\sum_{n=1}^{N} (\bar{d}_n^{(q+1)}(\bar{d}_n^{(q+1)})^H)\right)^{-1} \quad \text{(Equation 10)}$$

Here, it is given that $\bar{d}_n^{(q+1)} = [\bar{d}_{1,n}^{(q+1)}\ \bar{d}_{2,n}^{(q+1)}\ \ldots\ \bar{d}_{N_t,n}^{(q+1)}]$, and the initial estimate of the channel H is found by the pilot symbol. Referring to FIG. 5, it is given that $\bar{D}^{(q+1)} = [\bar{d}_1^{(q+1)}\ \bar{d}_2^{(q+1)}\ \ldots\ \bar{d}_N^{(q+1)}]$.

Further, when all transmitters (not shown) simultaneously transmit pilot symbols to a pilot symbol interval, the initial estimate of the channel H is expressed by Equation 11.

$$\hat{H}^{(0)} = \left(\sum_{n=1}^{N_p} (y_n(d_n^{(p)})^H)\right)\left(\sum_{n=1}^{N_p} (d_n^p(d_n^{(p)})^H)\right)^{-1} \quad \text{(Equation 11)}$$

Here, $d_n^p$ is a pilot symbol vector transmitted to the n-th symbol interval, and $N_p$ pilot symbol vectors are transmitted for each block. When the respective transmit antennas transmit the pilot symbols to the different symbol interval without overlapping, the initial estimate of the channel H is expressed by Equation 12.

$$\hat{h}_i^{(0)} = \frac{1}{N_p}\sum_{n=1}^{N_p} r_n d_{i,n}^p \quad \text{(Equation 12)}$$

Here, $d_{i,n}^p$ is the pilot symbol transmitted from the i-th transmit antenna in the n-th symbol interval.

Also, referring to FIG. 6, the covariance estimator 160 estimates the covariance $R_{vv}$ by using the received signal Y, the transmitted signal to which a soft decision is applied by the data soft decision units ($142_1$-$142_{Nt}$), and channel information estimated by the channel estimator 150. That is, since the interference applied by the ($N_s$-$N_t$) transmit antennas cannot be cancelled, the interference is suppressed by estimating the covariance $R_{vv}$. The covariance $R_{vv}$ can be estimated by Equation 13.

$$\hat{R}_{vv}^{(q+1)} = \frac{1}{N}\sum_{n=1}^{N}(y_n - \hat{H}^{(q+1)}\bar{d}_n^{(q+1)})(y_n - \hat{H}^{(q+1)}\bar{d}_n^{(q+1)})^H \quad \text{(Equation 13)}$$

Here, the initial estimate $\hat{R}_{vv}^{(0)}$ of the covariance $R_{vv}$ is found by the pilot symbol. When all transmitters (not shown) simultaneously transmit pilot symbols in one pilot symbol interval, the initial estimate $\hat{R}_{vv}^{(0)}$ of the covariance is expressed by Equation 14.

$$\hat{R}_{vv}^{(0)} = \frac{1}{N}\sum_{n=1}^{N_p}(y_n - \hat{H}^{(0)}\bar{d}_n^p)(y_n - \hat{H}^{(0)}\bar{d}_n^p)^H. \quad \text{(Equation 14)}$$

When the respective transmitters (not shown) transmit the pilot symbol to different symbol intervals without overlapping, the initial estimate $\hat{R}_{vv}^{(0)}$ of the covariance is expressed by Equation 15.

$$\hat{R}_{vv}^{(0)} = \frac{1}{N_t N_p}\sum_{n=1}^{N_t N_p}(y_n - \hat{H}^{(0)}\bar{d}_n^{(0)})(y_n - \hat{H}^{(0)}\bar{d}_n^{(0)})^H. \quad \text{(Equation 15)}$$

The respective transmitters (not shown) transmit $N_p$ pilot symbols, and the receive antennas ($112_1$-$112_m$) receive the pilot symbols in a different time, and hence, $N_tN_p$ symbols include the pilot symbol from among the N symbols. Therefore, it is given that $\bar{d}_n^{(0)}=[0_{i-1}^T \, d_{i,n}^P \, 0_{N_t-i}^T]^T$ when the i-th transmit antenna transmits the pilot symbol in the n-th symbol. Here, $d_{i,n}^P$ is the pilot symbol that is transmitted by the i-th transmitter in the n-th symbol, and $0_k$ is the vector with k 0's.

The hard decision unit 170 determines the transmitted signal by using the LAPP of the decoded bit that is a channel decoding output.

A method for detecting a transmitted signal by a receiver according to an exemplary embodiment of the present invention will now be described with reference to FIG. 7.

FIG. 7 shows an operational flowchart of a receiver according to an exemplary embodiment of the present invention.

As shown in FIG. 7, the receiver 100 finds $\hat{H}^{(0)}$ and $\hat{R}_{vv}^{(0)}$ by using the pilot symbol, resets $\bar{d}_n^{(0)}=0$, and sets q=0 (S710).

The signal detector 120 generates an interference estimate by using $\bar{d}_n^{(q)}$, $\hat{H}^{(q)}$ and $\hat{R}_{vv}^{(q)}$ and cancels them from the received signal $y_n$. The signal detector 120 multiplies the interference estimate cancelled received signal by $w_{k,n}^{(q+1)}$ to suppress the residual interference, and outputs $z_{k,n}^{(q+1)}$ (S720).

The decoder 130 calculates the LLR by using the output signal $z_{k,n}^{(q+1)}$ provided by the signal detector 120, performs a decoding process by using the LLR, and outputs a decoded signal $\lambda_c^{(q+1)}(d_n)$ (S730).

The decoder 130 performs the step of S750 when the value of (q+1) is less than a predetermined number of iteration times Q, and it performs the step of S790 in another case. When the value of (q+1) becomes equal to the predetermined number of iteration times Q, the hard decision unit 170 determines the transmitted signal by using the signal output by the decoder 130 (S790). When the value of (q+1) becomes less than the predetermined number of iteration times Q, the soft decision unit 140 outputs the transmitted signal $\bar{d}_n^{(q+1)}$ to which the soft decision process is applied by using the signal $\lambda_c^{(q+1)}(d_n)$ output by the decoder 130 (S750).

The channel estimator 150 outputs the estimated channel $\hat{H}^{(q+1)}$ by using the received signal $y_n$ and the transmitted signal $\bar{d}_n^{(q+1)}$ (S760). The covariance estimator 160 estimates the covariance $\hat{R}_{vv}^{(q+1)}$ by using the received signal $y_n$, the transmitted signal $\bar{d}_n^{(q+1)}$, and the estimated channel $\hat{H}^{(q+1)}$, and outputs the estimated covariance $\hat{R}_{vv}^{(q+1)}$ to the signal detector 120 (S770). It is updated as q=q+1 (S780), and it goes to the step of S720.

That is, the steps (S710-S780) are iterated from the time of q=0 to the time just before q+1=Q, and the transmitted signal is determined by using the signal output by the decoder 130 when it is given that q+1=Q.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment of the present invention, the receiving performance of the signal transmitted from the transmitter can be increased by iterating signal detection, decoding, channel estimation, and covariance estimation by the receiver a predetermined number of times.

What is claimed is:

1. An iterative receiver comprising:
a signal detector for canceling interference estimated from a transmitted signal to which a soft decision process is applied from a received signal;
a decoder for performing a channel decoding process by using the interference cancelled received signal;
a soft decision unit for performing a soft decision process on the transmitted signal by using the channel decoded signal, and transmitting a resultant signal to the signal detector;
a channel estimator for estimating a channel through which the transmitted signal is passed by using the soft decision applied transmitted signal and the received signal;
a covariance estimator for estimating covariance on the sum signal of the interference and noise by using the soft decision applied transmitted signal, the received signal, and the estimated channel; and
a hard decision unit for determining the transmitted signal by using the signal output by the decoder.

2. The iterative receiver of claim 1, wherein
the hard decision unit uses the channel decoded signal output by the decoder when the interference signal cancellation, the channel decoding, the soft decision, the channel estimation, and the covariance estimation are iterated a predetermined number of times.

3. The iterative receiver of claim 2, wherein
the signal detector estimates the interference according to the estimated channel and the soft decision applied transmitted signal.

4. The iterative receiver of claim 3, wherein
the initial value of the soft decision applied transmitted signal is 0, and the initial estimate of the channel is found from a pilot symbol.

5. The iterative receiver of claim 3, wherein
the signal detector includes:
an interference canceller for generating an interference estimate, and canceling the generated interference estimate from the received signal; and
a minimum mean squared error (MMSE) filter for suppressing uncancelled interference and undetected interference from the interference estimate cancelled received signal, and transmitting a resultant signal to a decoder.

6. The iterative receiver of claim 5, wherein
the signal detector further includes a filter coefficient updater for finding a weight coefficient from the estimated covariance, and
the MMSE filter suppresses the interferences by multiplying the interference estimate cancelled received signal by the weight coefficient.

7. The iterative receiver of claim 6, wherein
the decoder includes:
a log-likelihood ratio (LLR) calculator for calculating an LLR of the transmitted signal from the weight coefficient, the interference suppressed received signal, and the estimated channel; and
a channel decoder for channel decoding the transmitted signal by using the calculated LLR.

8. The iterative receiver of claim 7, wherein
the soft decision unit performs a soft decision process on the transmitted signal from the channel decoded signal and the LLR.

9. A method for an iterative receiver to detect a transmitted signal comprising:
- canceling estimated interference from a received signal by using estimated channel information;
- channel decoding the transmitted signal by using the estimated interference cancelled received signal;
- performing a soft decision process on the transmitted signal by using the channel decoded signal;
- updating the estimated channel information by using the soft decision applied transmitted signal and the received signal;
- iterating the canceling, the channel decoding, the performing of the soft decision process, and the updating a predetermined number of times; and
- determining the transmitted signal from the channel decoded signal when the processes are iterated a predetermined number of times.

10. The method of claim 9, wherein the method further includes
- estimating covariance on the sum signal of the interference and noise by using the soft decision applied transmitted signal, and
- the canceling includes:
- generating an interference estimate from the estimated channel information;
- canceling the generated interference estimate from the received signal; and
- multiplying the interference estimate cancelled signal by the weight coefficient acquired from the estimated covariance, and outputting a resultant signal, and
- the iterating includes iterating the estimating by the predetermined number of times.

11. The method of claim 10, wherein
the interference estimate is generated by the estimated channel information and the soft decision applied transmitted signal.

12. The method of claim 10, wherein
the initial value of the estimated channel information is found from the pilot symbol.

13. The method of claim 12, wherein
the covariance is estimated by using the soft decision applied transmitted signal, the received signal, and the estimated channel information.

14. The method of claim 13, wherein
the channel decoding includes:
- calculating a log-likelihood ratio of the transmitted signal from the weight coefficient, the estimated interference cancelled received signal, and the estimated channel information; and
- channel decoding the transmitted signal from the calculated log-likelihood ratio, and
- the transmitted signal is soft decision performed by using the calculated log-likelihood ratio.

* * * * *